(12) United States Patent
Howarter et al.

(10) Patent No.: US 8,750,905 B2
(45) Date of Patent: *Jun. 10, 2014

(54) SYSTEM AND METHOD FOR CONTROLLING WIRELESS COMMUNICATIONS

(71) Applicant: CenturyLink Intellectual Property LLC, Denver, CO (US)

(72) Inventors: Jamie Christopher Howarter, Kansas City, MO (US); Charles Michael Lesher, Louisburg, KS (US); Jeffrey Sweeney, Olathe, KS (US); Robert J. Morrill, Overland Park, KS (US); Heather Ann Hull, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,400

(22) Filed: Apr. 29, 2013

(65) Prior Publication Data

US 2013/0237207 A1 Sep. 12, 2013

Related U.S. Application Data

(63) Continuation of application No. 12/346,488, filed on Dec. 30, 2008, now Pat. No. 8,433,343.

(51) Int. Cl.
*H04W 4/00* (2009.01)

(52) U.S. Cl.
USPC .............. 455/456.4; 455/418; 455/575.9

(58) Field of Classification Search
USPC ........... 455/410–411, 456.1–456.6, 575.9, 455/414.1–414.3, 418–420, 569.1–569.2
See application file for complete search history.

(56) References Cited

U.S. PATENT DOCUMENTS

| | | | |
|---|---|---|---|
| 6,973,333 B1* | 12/2005 | O'Neil | 455/569.2 |
| 7,133,661 B2 | 11/2006 | Hatae et al. | |
| 7,317,927 B2* | 1/2008 | Staton et al. | 455/456.4 |
| 8,090,399 B2* | 1/2012 | Howarter et al. | 455/550.1 |
| 8,290,480 B2* | 10/2012 | Abramson et al. | 455/418 |
| 8,346,248 B2* | 1/2013 | Howarter et al. | 455/431 |
| 2002/0119788 A1 | 8/2002 | Parupudi et al. | |
| 2003/0134626 A1* | 7/2003 | Himmel et al. | 455/419 |
| 2003/0186710 A1* | 10/2003 | Muhonen et al. | 455/456.5 |
| 2004/0127203 A1 | 7/2004 | Markki et al. | |
| 2005/0130680 A1* | 6/2005 | Northcutt | 455/457 |
| 2005/0165518 A1 | 7/2005 | Reynolds et al. | |
| 2005/0227713 A1* | 10/2005 | Bates et al. | 455/456.4 |
| 2008/0214203 A1* | 9/2008 | Titli et al. | 455/456.1 |

(Continued)

FOREIGN PATENT DOCUMENTS

JP 2007223517 A 9/2007

*Primary Examiner* — Sharad Rampuria
(74) *Attorney, Agent, or Firm* — Swanson & Bratschun, L.L.C.

(57) ABSTRACT

A method and database management system for controlling the operability of a mobile communications device. A geographic location of a vehicle is determined. A position of the mobile communications device with in the vehicle is determined. Conditional parameters of the mobile communications device are determined. Database records correlating location information with restrictions are accessed. A determination is made whether use of the mobile communications device should be restricted within the vehicle in response to the geographical location, the position of the mobile communications device within the vehicle, the conditional parameters, and the database records The capabilities of the mobile communications device are configured in response to the restrictions.

20 Claims, 5 Drawing Sheets

(56) References Cited

U.S. PATENT DOCUMENTS

| | | |
|---|---|---|
| 2008/0299900 A1 | 12/2008 | Lesyna |
| 2009/0111422 A1* | 4/2009 | Bremer et al. ............ 455/404.2 |
| 2009/0312038 A1* | 12/2009 | Gildea ..................... 455/456.4 |

* cited by examiner

SYSTEM AND METHOD FOR CONTROLLING WIRELESS COMMUNICATIONS

CROSS REFERENCE TO RELATED APPLICATION

This application is a continuation of U.S. patent application Ser. No. 12/346,488 entitled WIRELESS HANDSET VEHICLE SAFETY INTERLOCK DATABASE, filed on Dec. 30, 2008, the entire teachings of which are incorporated herein.

BACKGROUND OF THE INVENTION

Wireless communications devices, including wireless handsets, PDAs, text messengers and many other portable electronic devices have become prolific in modern society. Along with the convenience of "anywhere and anytime" communications comes the distractions and potential safety problems and interference caused by the wireless communications devices.

Some localities, such as states or cities, have passed ordinances or other laws prohibiting the use of wireless communications devices at various times or in various places (e.g., school zones). Often times, a person may be unaware of or confused about, various local laws and the result may be a fine or other citation.

BRIEF SUMMARY OF THE INVENTION

On embodiment of the illustrative embodiments provides a method and database management system for controlling the operability of a mobile communications device. A geographic location of a vehicle may be determined. A position of the mobile communications device with in the vehicle may be determined. Conditional parameters of the mobile communications device may be determined. Database records correlating location information with restrictions may be accessed. A determination may be made whether use of the mobile communications device should be restricted within the vehicle in response to the geographical location, the position of the mobile communications device within the vehicle, the conditional parameters, and the database records. The capabilities of the mobile communications device may be configured in response to the restrictions.

Another embodiment provides a database management system. The database management system may include a processor configured to execute a set of instructions and a memory configured to store a set of instructions. The set of instructions may be executed by the processor to determine a geographic location of a vehicle, determine a position of the mobile communication devices within the vehicle, determine conditional parameters of the mobile communications device, access database records correlating the geographic location with restrictions, determine whether use of the mobile communications device should be restricted within the vehicle in response to the geographical location, the position of the mobile communications device within the vehicle, the conditional parameters, and the database records, and configure the capabilities of the mobile communications device that are available in response to the restriction determination.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1A:
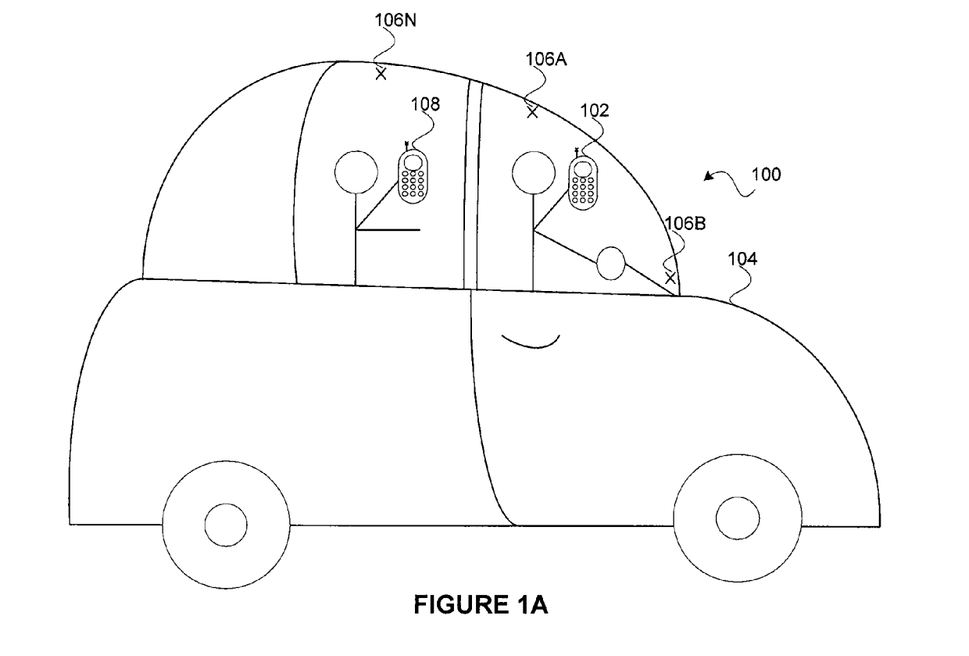
FIG. 1A is an illustration of one embodiment of an environment depicting a wireless communications device configured to enable the transmitter to be situationally controlled.

FIG. 1A is an illustration of one embodiment of an environment 100 depicting a wireless communications device 102 configured to enable the transmitter to be situationally controlled. In other words, depending upon a particular location, time, speed, or some other factor, the transmitter operability may be affected. In this embodiment, the wireless communications device 102 may be located within a vehicle 104, such as an automobile. In this embodiment, located within the vehicle 104 are directional sensors 106a-106n (collectively, 106), which may be used for determining a location of the wireless communications device 102 within the vehicle 104. In one embodiment, an additional wireless communications device 108 may also be located within the vehicle 104. As depicted in the illustration, the additional wireless communications device 108 may be located remotely from the driver's side of the vehicle, such as on a rear seat of the vehicle 104. The directional sensors 106 may be used to determine a usefully proximate location of the particular wireless communications device being referred to.

The wireless communications devices 102 and 108 may be cellular phones, PDAs, text messengers, or any other portable electronic devices capable of communicating wirelessly over a communications network. The vehicle 104 may be a car, truck, bus, airplane, train, or any other vehicle in which an operator may need to devote his or her concentration in order to control the vehicle 104. The previously listed vehicles may require different levels of restrictions depending on the location of the vehicle, the position of the user operating the wireless communications device 102, relevant laws, safety concerns, and other variables.

Because of a need to address these variations, the directional sensors 106 may be able to help determine the precise location of the vehicle 104, or specifically the wireless communications device, for use in making the restriction determinations. In one embodiment, restrictions may include disabling the device, restricting some functions of the device, such as a keyboard or wireless transmitter, manipulating the operating mode of the device, such as turning off a ringer, and setting the device into vibrate mode, or other similar functions. The directional sensors 106 may involve radar, sonar, laser, pressure, GPS, triangulation, or any other technology that allows the sensors to determine the location of the person using the wireless communications device 102. For example, if there are sensors placed within the seats and the only sensor activated is from a driver's position (i.e., the driver is the only person in the vehicle), no other sensor type may be necessary to determine the position of the user using the wireless communications device. A seat sensor may be comprised of pressure or weight sensors, lasers, thermal, or any type or variety of sensors configured to determine data regarding the seat and/or its occupant.

In addition to the seat sensor, there may be any number and types of sensors both within the vehicle and the mobile communications device itself. For example, in one embodiment, a signal strength sensor may be located within the steering wheel. Depending upon the distance from the steering wheel, the precise location may be determined based on the strength of the signal (e.g. if the strength is equivalent to being within a predetermined distance from the steering wheel, it may be assumed that the wireless communications device is within the operator's position.) In another embodiment, one or more sensors located within the vehicle may use signal strength and triangulation to determine whether the wireless communications device is within the operator's position.

A passenger may not typically be tasked with the burden of operating the vehicle. As a result, the second wireless communications device 108, which may be similar to, or the same as, the type described for the wireless communications device 102 or any other similar device, may not face the same restrictions as the wireless communications device 102. Therefore, a passenger of a vehicle may not be limited in the use of his or her wireless communications device while located within the vehicle.

The wireless communications device may contain software and/or hardware that would regularly monitor the operations of the device and automatically adjust the settings according to the situation that was observed. For example, in one embodiment, if a passenger initiated a call and then handed the wireless communications device to the driver, and the device had driver restrictions, then the device would automatically modify the operations of the device to meet the operating parameters defined by the restrictions. The modification in this enablement may include dropping the in-progress call, turning off the device, or any number of similar options.

Figure 1B:
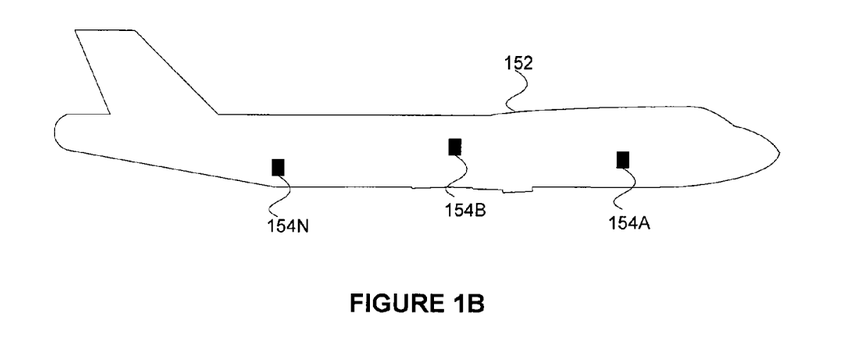
FIG. 1B is an illustration of one embodiment of an airplane depicting a wireless communications device configured to enable the transmitter to be situationally controlled.

FIG. 1B is an illustration of one embodiment of an airplane 152 containing one or more wireless communications devices 154a-154n (collectively 154) configured to enable a transmitter to be situationally controlled. Unlike many other vehicles, such as the vehicle described in FIG. 1A, the location of a particular wireless communications device 154 within the airplane 152 may not be relevant to the desirability to control the transmitter of the wireless communications device 154. Regardless, there still may be various sensors and other instruments within the airplane, which are described below in greater detail in relation to FIG. 1C. These sensors and instruments may, among other things, detect wireless communications devices and contribute to the disabling of the transmit functionality, if necessary. For example, in one embodiment, transmitters within the cockpit may not be disabled. While regulations and airline policies may vary, there may be specific times within a flight, from passengers' boarding to passengers' disembarking, when the transmitter is either required or preferred to be disabled. More detailed information regarding the timing of transmitter disabling is described below in reference to FIG. 2.

A blanket disabling of wireless communications devices including both wireless transmitter and/or wireless receiver devices, regardless of its location within a plane, may be provided for reasons that are different than for an automobile. For example, in addition to airline safety, use of some types of wireless communications devices such as cell phones in an airplane traveling at a high rate of speed can raise havoc on cellular operator networks. Often, a wireless communications device can be seen by multiple cell towers forcing multiple device registrations in the cellular operator's Home Location Registrar (HLR) or equivalent equipment. Also, cellular operator soft hand-off algorithms may have difficulty in processing calls during flight due to the spatial rate of the wireless communications device. There may be many other reasons for disabling wireless communications devices in addition to the ones mentioned for disabling the devices.

Figure 1C:
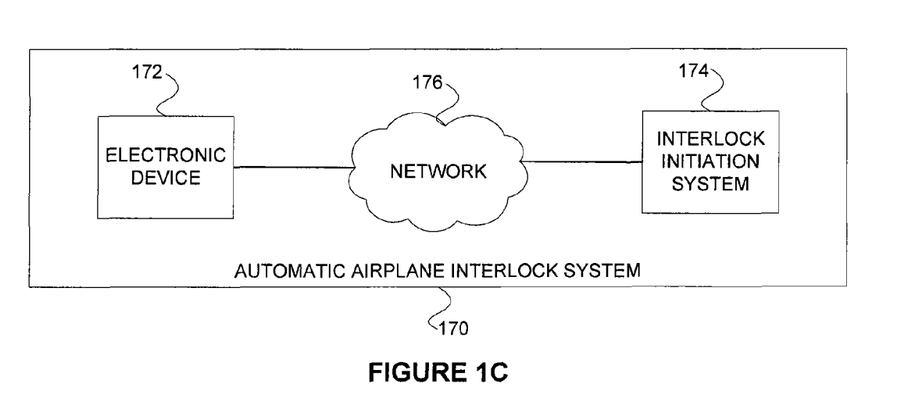
FIG. 1C is an illustration of one embodiment of an automatic airplane interlock system.

FIG. 1C is an illustration of one embodiment of an Automatic Airplane Interlock System (AAIS) 170. The AAIS 170 may be comprised of two primary components that act to automatically place wireless communications devices into an airline regulated mandatory operating mode. Two components of the AAIS 170 may be a wireless communications device, also known as an Electronic Device (ED) 172 and an Interlock Initiation System (IIS) 174. The ED 172 and IIS 174 may be interlinked via a wireless network 176, such as Bluetooth, CDMA, WiFi, or other wireless technologies.

In one embodiment, the AAIS 170 may be a wireless transmitter capable of issuing a special "Safe Operating Mode" (SOM) signal or signals. One or more types of wireless technology signals such as BlueTooth, WiFi, Ultra-wide band or other may be transmitted either serially or in parallel by the AAIS. These signals may contain the SOM embedded within the payload of the transmitted information. A single antenna or multiple distributed antennas (not shown) may be placed throughout the cabin and/or luggage hold of the airplane. A signal power that is to be transmitted may be adjusted such that adequate coverage is performed within the body of the aircraft, and signal leakage to nearby aircraft is minimized. Directional or beam-forming antennas (not shown) may be used to direct the signal along the linear cabin path.

In one embodiment, the IIS 174 may be initiated by a pilot or alternatively by the airplane entering a traveling state such as taxiing from a gate and/or being in flight. The IIS 174 may function by issuing a wireless signal containing the SOM which is received by all the ED's 172. Alternatively, the wireless signal may include an airline authority digital signature such that the ED 172 can recognize and validate the issuing signal authority. This SOM signal may used to instruct the ED to place itself into a safe operating mode state.

Additionally, the electronic device 172 may equipped with a wireless receiver capable of capturing the SOM signal, software checksum logic to determine if the SOM signal has been received intact, and software and/or hardware logic used to process and control the operation of the ED 174. In one embodiment, all logic is integral to the device and has adequate Operating System priority to allow the device to instantly respond to the SOM signal.

Figure 1D:
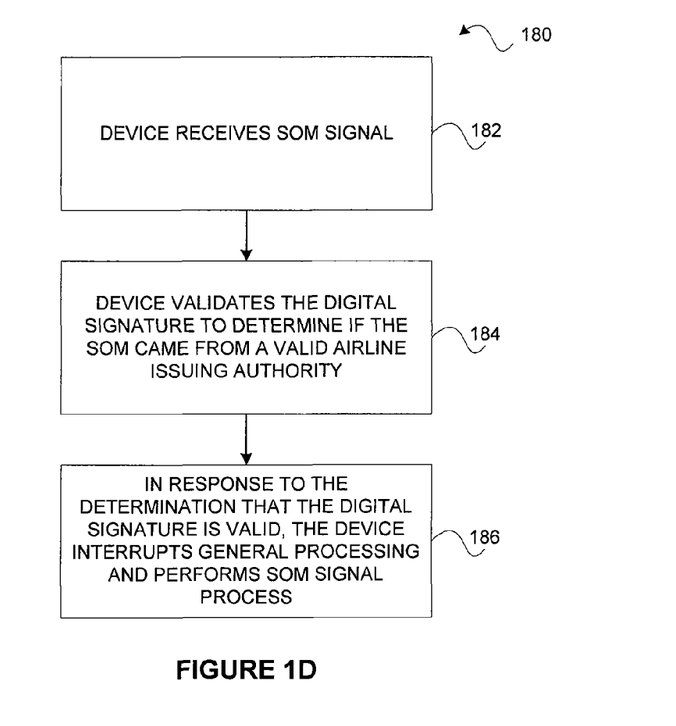
FIG. 1D is an illustration of one embodiment of a process for controlling the operability of a transmitter on a mobile communications device within an airplane.

FIG. 1D is an illustration of one embodiment 180 of a process for controlling the operability of a transmitter on a mobile communications device within an airplane. The wireless communications device may receive an SOM signal in step 182. In step 184, the wireless communications device may validate the digital signature to determine if the SOM signal came from a valid airline issuing authority. If the digital signature is not valid, then the wireless communications device does not enter SOM state. In step 186, if the digital signature is valid, then the wireless communications device may interrupt general processing and perform an SOM signal process which places the device into a safe operating mode state. Alternatively, the wireless communications device may issue a pre-recorded voice interrupt message to a person using the device as a telephone. The pre-recorded voice interrupt message would indicate the device will be entering SOM mode within a short timeframe as established by a count-down timer. The count-down time may be established by a pilot or by the airplane and passed to the wireless communications device 172 via the IIS 174.

In an alternative embodiment, the wireless communications device may issue an on-screen message or screen window pop-up if the wireless communications device is in data mode. The on-screen message will indicate that the device will enter SOM within a short timeframe. This timeframe could be established by the airline authority and transmitted with the SOM message thereby allowing a graceful call termination.

In one embodiment, the IIS may include one or more electronic transmission systems utilizing common wireless technologies such as CDMA, GSM, WiFi, WiMax, LTE or any other wireless technologies. The IIS may perform several functions and utilize various equipment. Hardware and/or software that manually interact with the pilot and/or automatically interact with aircraft to initiate SOM signal may be included. This equipment may include switches and interlock mechanisms. Configurations may be either redundant or non-redundant. Also included may be hardware and/or software that formats the SOM signal or signals into the wireless technology information packet.

Additionally, the digital signature and/or count-down time may be included in the information packet. The packet may contain a checksum verification code that may be established during packet formation to be used by the wireless communications device to validate the entire packet is received intact. Any form of checksum code may be implemented. The IIS may broadcast the SOM signal using one or more wireless technologies.

In one embodiment, the IIS may monitor the local cabin area for radiated electronic device signals in the frequency band or bands specific to the wireless technologies employed in the IIS system. The purpose of this monitoring is to assure that all wireless signals are shut-down following the issuance of the SOM signal. The IIS equipment controller may manage the transmission of the SOM signals if more than one wireless technology is used such that each signal is non-interfering with other SOM signals. The IIS equipment may also be used to modify the beam-forming antenna radiating power if directional antennas are employed.

Figure 2:
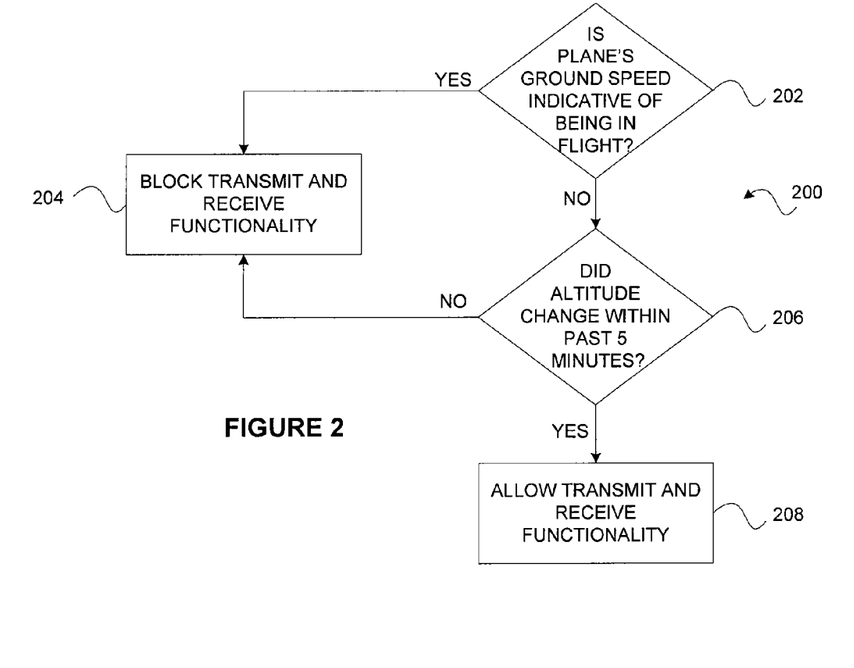
FIG. 2 is a flow chart of an alternate embodiment of a process for controlling the operability of a transmitter on a mobile communications device within an airplane.

FIG. 2 is a flow chart of an alternate embodiment of a process 200 for controlling the operability of a transmitter on a mobile communications device within an airplane. At step 202, a determination may be made as to whether the ground speed of the airplane is indicative of the airplane being in flight. If the ground speed is indicative of the airplane being in flight, electronic use and/or transmit and receive functionality may be blocked for the wireless communications device in step 204. In general, during flight, wireless communications devices are not allowed to have their transmit and receive capability functioning and during some portions of the flight, all electronic functions are not allowed. However, there may be exceptions for emergencies or other situations, as described below.

If the airplane's ground speed is not indicative of the airplane being in flight, at step 206 a determination may be made as to whether there was a change in altitude within a set or predetermined period of time, (e.g., 5 minutes) in step 206. In most locations, current regulations allows for the use of the transmit and receive functionality of the wireless communications devices while taxiing upon landing at a destination airport, but not during taxiing for take-off. By making the determination that the plane's ground speed is not indicative of flight and that no altitude change has occurred in a predetermined period of time, the determination that the plane is either stationary at the gate or taxiing for takeoff, may be safely made. Additionally, a sensor for main cabin doors may be provided in one embodiment. Any time the determination is made that one or more cabin doors are opened, the transmit and receive functionality may be enabled. If the ground speed of the airplane is zero or a cabin door is opened, a determination can be made that the airplane is stationary at the gate. If the groundspeed is beyond a set number (e.g. 100 mph) and all cabin doors are indicating they are closed, a determination can be made that the airplane is in flight.

In other words, had the plane recently experienced a change in altitude (e.g., landing or taking off), but is no longer in flight (e.g., ground speed not indicative of flight), the conditions indicate that the plane has landed, therefore the transmit and receive functionality may be enabled. In step 208, the transmit and receive functionality of the wireless communications device may be enabled. Cabin, as used in this application refers to any area within the skin of the airplane. However, alternatively, a cockpit or any other zone of an airplane may not be included within the definition of the cabin. In other words, the ability to enable or disable a transmitter within the airplane may be limited to zones as well as the plane as a whole.

It should be understood that the entire determination may be based upon calculations and measurements made within the wireless communications device itself, by one or more sensors and transceivers external to the wireless communications device, or a combination of the two. It is also important to note that in the case of the airplane as well as the vehicle described in FIG. 1A, when various emergencies occur or particular situations are encountered, enabling and disabling of the wireless communications features may be overridden at least by a user or the wireless communications device itself. It should also be understood that some electronic devices may be equipped with a wireless receiver only, and that this method and system may be used to control the device operating functionality per airline or location specifications or requirements.

Figure 3:
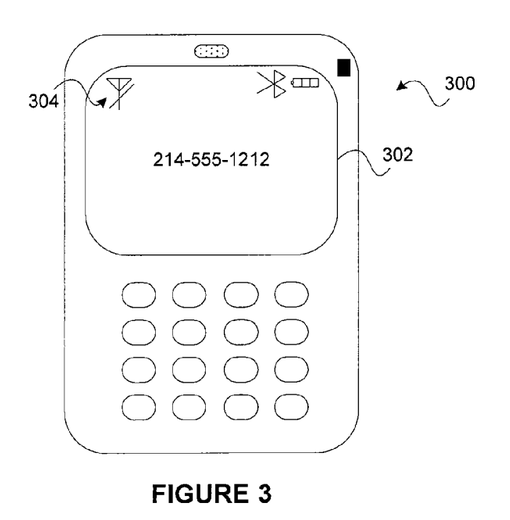
FIG. 3 is an illustration of one embodiment of a wireless communications device configured to enable the transmitter to be situationally controlled.

FIG. 3 is an illustration of one embodiment of a wireless communications device 300 configured to enable a transmitter to be situationally controlled. The transmitter may allow for two-way communications over a wireless network such as cellular, a LAN, satellite, or any other communications network. Additionally, the wireless communications device 300 may also be an electronic device including a wireless receiver only, that is capable of being situationally controlled. The wireless communications device 300 may include a display screen 302 configured to display data, such as a number being dialed, a text message, an email, or any other type of visual data. In one embodiment, the display screen 302 depicts a signal strength indicator 304 that would traditionally display the strength of the wireless communications network as measured by the wireless communications device 300. In this embodiment, the signal strength indicator 304 may alternatively or additionally depict a slash through the indicator that may indicate that there is no transmit or receive capability operating at the present time. In general, the signal strength indicator 304 will indicate that the transmitter is inoperable either when the transmitter is purposefully disabled or, in certain situations, the signal strength indicator 304 may depict that there is no functionality because of a lack of signal strength in the particular location. In one embodiment, when the transmitter is disabled, the signal strength indicator 304 will appear, as illustrated in FIG. 3. Alternatively, any type of indication or message may be presented to the device user indicating that the device is disabled or operating in a restricted mode. Indicator could include LEDs, icons, messages, audible indicators, or other similar notifications.

Figure 4:
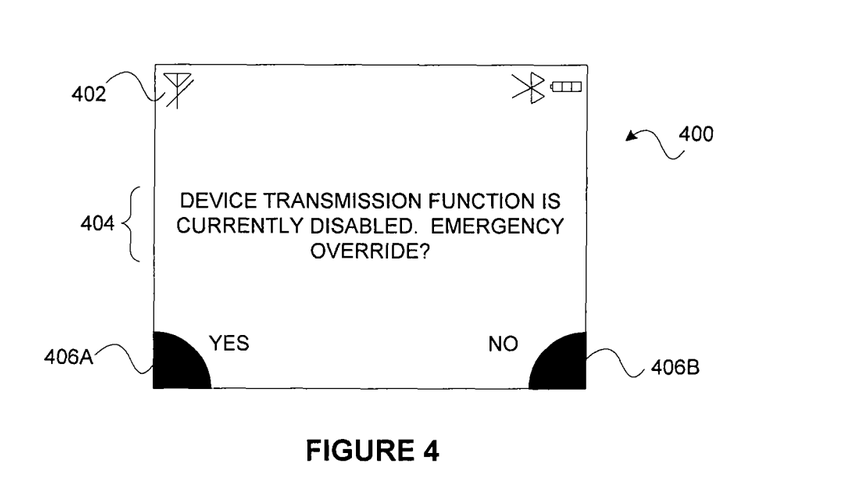
FIG. 4 is an illustration of one embodiment of a screen shot depicting a wireless communications device configured to enable the transmitter to be situationally controlled.

FIG. 4 is an illustration of one embodiment of a screen shot 400 depicting a wireless communications device configured to enable a transmitter to be situationally controlled. In this embodiment, the signal strength indicator 402 depicts the transmitter as being disabled. An override message 404 such as a message stating "[D]evice transmission function is currently disabled. Emergency override?" The override message 404 may prompt a user to enter a certain input to override the disabled transmitter for various reasons. For example, in an emergency, such as a crash or other dangerous situation, a user, even in the driver's seat, may need access to the full capabilities of the wireless communication device. Response buttons 406a and 406b (collectively, 406) representing "yes" or "no" indicates to the user what input is necessary for overriding the transmit disable feature. Any number of alternative ways for overriding the transmit disable feature may also be provided. In one embodiment, a user wishing to override the transmit disable functionality would select either a hard-button or a soft-button located on the phone as indicated by response buttons 306.

A determination of when an emergency has occurred may be made in several ways. In one embodiment, the vehicle may be configured to communicate emergency information with the wireless communications device. For example, if an airbag deployment is detected by the vehicle, the wireless communications device may be alerted that an emergency has occurred and the disabling of the transmitter and receiver may be overridden. Some vehicles may have emergency response functions built in, such as GM's On-Star® or Mercedes' and BMW's SOS systems. The various emergency response systems may be configured to communicate with the wireless communications devices and may allow for any disabling to be overridden.

In other embodiments, in addition to, or in place of notification from the vehicle, the wireless communications device may be able to determine that an emergency has occurred. For example, some wireless communications devices may include accelerometers or other impact sensors. Upon determining that a crash or other emergency likely occurred, any disabled features may automatically become enabled. It is to be understood that any combination of vehicle or mobile communications device features may be used in making the determination of an emergency occurrence.

Figure 5:
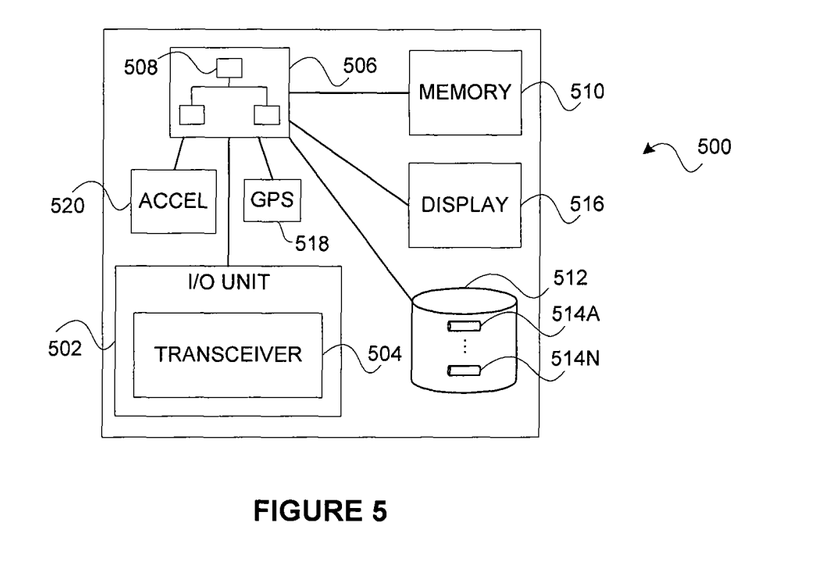
FIG. 5 is a block diagram of one embodiment of components of a mobile communications device configured to control the transmit functionality on a mobile communications device.

FIG. 5 is a block diagram of exemplary components 500 of a mobile communications device (e.g., 300 from FIG. 3) configured to control the transmit functionality on a mobile communications device. The mobile communications device 300 may include an input/output (I/O) unit 502 for receiving and communicating commands and other data between the mobile communications device and a vehicle, such as an automobile or airplane. The I/O unit 502 may additionally include a transceiver 504 for transmitting voice and data to a communications network. The mobile communications device 300 may also include a processor 506 for processing the data necessary to determine the transmit functionality. The processor 506 may execute software 508 capable of performing the functionality of the wireless communications device 200. Software modules that operate in the software 508 are described below in more detail in reference to FIG. 6. Memory 510 may also be located within the wireless communications device 300 for storing data being processed by the processor 506. A data repository 512 may also be included in or be in communication with the wireless communications device 300. The data storage unit 512 may be a hard drive or any other type of volatile or non-volatile memory capable of storing data. Within the data storage unit 512 may be one or more data repositories 514a-514n, such as a database or multiple databases, capable of storing and organizing data. In one embodiment, rather than including the data storage unit 512, the wireless communications device 300 may use a memory 510 that is large enough to store any necessary data.

A display 516 may be provided for displaying data or other information to a user of the wireless communications device 300. The display may be a part of the wireless communications device itself, or may be in communication with the wireless communications device. A GPS component 518 may also be including within the wireless communications device 300. The GPS component 518 may allow for the wireless communications device to determine location, ground speed, altitude and a variety of other useful information. Used alone or in combination with an accelerometer 520, the GPS component 518 may also help to determine if an emergency situation has occurred. The accelerometer 520 may be able to provide immediate notification of any sudden stops or unexpected movements with may indicate that an accident or other emergency has occurred. It is important to note that some or all of these components may be located within the wireless communications device or within the vehicle itself. For components located in the vehicle, simply being in communication may provide all o the information to the wireless communications device that is necessary.

Figure 6:
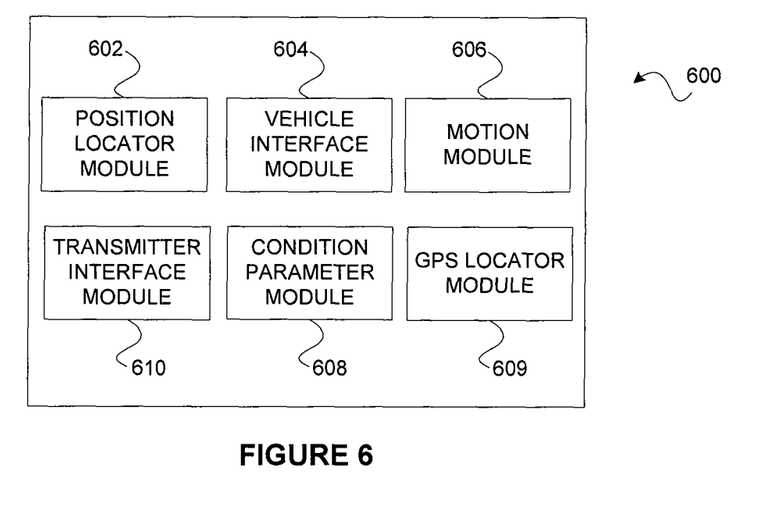
FIG. 6 is a block diagram of one embodiment of modules configured to control the transmit functionality on a mobile communications device.

FIG. 6 is a block diagram of one embodiment of modules 600 configured to control, transmit, and/or receive functionality on a mobile communications device. A position locator module 602 may be provided for allowing the location of wireless communications devices within a vehicle to be determined. In one embodiment, the position locator module 602 may use the input from one or more directional sensors or other sensors in making a determination as to the location of the wireless communications device. In another embodiment, a single sensor may be used to determine the location of the wireless communications device. As described previously, determining the location of the wireless communications device may allow for the necessity of any restrictions to the wireless communications device transmit function to be determined and carried out. Depending on the type of sensor, calculations may need to be performed by the position locator module 602 or another device, involving triangulation, weight, measurement, signal strength within a particular location, or other factors.

The vehicle interface module 604 may provide useful information to the position locator module 602 by providing relevant data as to conditions within the vehicle. For example, in one embodiment, the vehicle interface module 604 provides detailed information regarding the speed of the vehicle, the gear in which the vehicle is in (e.g., park, neutral, drive) among various other vehicle data. In one particular embodiment, such as an airplane, the altitude may also be determined within the vehicle interface module 604 and be provided for the determination of whether or not the transmitter should be operable at a particular time. The vehicle interface module may be a stand-alone device or a component of another device such as a hands-free telephone interface, a GPS system, a vehicle information system, or an OnStar® vehicle assistance system.

A motion module 606 may be provided for indicating whether or not the vehicle is currently in motion, regardless of which gear the vehicle may be in. This would allow a person stopped at a stop light or pulled over on the side of the road, who happens to be in an operator's position, access to the transmit function of their wireless communications device. Additionally, the motion module 606 may include an altimeter for determining the altitude of the vehicle. This may be particularly useful in an airplane situation where upon taxiing after landing, the transmit function may be activated, whereas after take-off, the transmit function would not be disabled, as described previously.

A condition parameter module 608 may also be provided which may take into account various conditions which may override the normal operation of disabling the transmit function of the wireless communications device or other operating parameters such as audible ringing. For example, if an emergency occurs, such as a vehicle accident, or if a user has chosen to manually override the automatic transmit disabling feature, the condition parameter module 608 may cause an override of the wireless communications device. The condition parameter module 608 may also be used in conjunction with the motion module 606, wherein the condition being determined is whether or not the vehicle is in motion in combination with other factors. Either, or both, of these modules may be present and describing separate modules for purposes of this application does not preclude the consolidation of any of these modules into fewer modules, or the addition of additional modules. In another example, such system may be employed by a concert hall or church and would be used to automatically place a wireless communications device into a silent or vibrate operating mode.

Another condition that may determined by the condition parameter module 608 may be similar to the position locator module 602 function as described previously. In other words, a condition may be the position within the vehicle where the operator of the wireless communications device is located. For example, a user in the passenger seat or anywhere else in the vehicle not responsible for operating the vehicle, should not be precluded from using the wireless communications device. As described previously, sensors of various types may be used in the position locator function.

In one embodiment, a database, such as the data storage unit 512 in FIG. 5, of local laws and ordinances may be provided or be available to the wireless communications device indicating local rules for when wireless communications devices may not be allowed to be used. The database may be local or remotely accessible to the wireless communications device. The condition parameter module 608 may be responsible for determining whether or not one of the local rules applies in the present situation. A GPS locator module 609 may be provided in one embodiment for determining an exact location of the vehicle, which may be used in coordination with the database of rules and ordinances involving prohibited wireless communications device usage. In combination, such a database, the GPS locator module 609 and the condition parameter module 608 may allow for a user who is otherwise unaware of any particular restrictions to be made aware by virtue of the transmitter automatically being disabled in localities where it is illegal or unsafe to use wireless communications devices while operating a vehicle. The GPS locator module 609 may use information available through cell site information, GPS functionality available within the wireless communications device itself, or any other method that may allow for the wireless communications device to determine its current physical location.

It should be noted that ad-hoc database updates may be received, depending upon location, that may supersede regulatory operating parameters. For example, a wireless device may be in an area where there normally are no operation restrictions. Said device may receive a restriction signal from a temporary or portable restriction transmitter required to support a specific purpose such as a 'No-transmit zone' around a demolition blasting area. This signal would override the generalized database operating specification. In essence, a hierarchy of operating specifications may be employed that provide more restrictive operations depending upon situation or location. There may be many other types of temporary restrictions that are placed based upon weather conditions, motorcades nearby, and many other events or circumstances.

The database of local laws and ordinances may be updated regularly to include changes in laws and ordinances. As new rules are passed for various municipalities, they may be automatically incorporated into the database to keep the database current. In addition to rules banning cell phones wholly, the database may keep track of areas in which text messaging is not allowed, where only hands free devices are allowed, certain time restrictions that may be in effect, as well as any other variations to the ordinances that may exist.

In one embodiment, a database table, such as Database Table 1 may be provided within a database management system. Database Table 1 may include various elements for identifying unique locations. In this embodiment, geographical coordinates, a city, a state, and street addresses are associated with a Unique Location ID. By having a Unique Location ID, either a physical address or coordinates may be referred to by the Unique Location ID. The Unique Location ID may serve as the primary key for reference in other databases. For example, in Database Table 2, various types of restrictions for wireless communications devices may be correlated to the Unique Location ID. For example, at Unique Location ID 8675309, no restrictions are required by law, based upon the database information. There may be many combinations of restrictions that can be defined for various locations. Just as examples, "Allow All," "Hands-free Only," "No Text Only," and "Both Restricted" are used as examples in Database Table 2. These categories are exemplary in nature and do not purport to limit the invention to those restriction types. It is also to be understood that using a database to refer to local laws is optional, and a blanket restriction of operability of the wireless communications device may occur without ever referencing this database information. It is also to be understood that depending upon the situation or location that additional restrictions may be issued to the wireless device.

DATABASE TABLE 1

| Coordinates | City | State | Address | Unique Location ID |
|---|---|---|---|---|
| 32 28'N, 93 46'W | Dallas | TX | 121 Main St. | 8675309 |
| 32 28'N, 93 42'W | Dallas | TX | 131 Main St. | 8675310 |
| 36 07'N, 114 51'W | Las Vegas | NV | 199 Elm Ct. | 9654123 |
| 32.18'N, 106 46'W | Las Cruces | NM | 98 Cactus Ave. | 5487963 |

DATABASE TABLE 2

| Unique Location ID | Allow All | Hands-free Only | No Text Only | Both Restricted |
|---|---|---|---|---|
| 8675309 | X | | | |
| 8675310 | | | X | |
| 9654123 | | | | X |
| 5487963 | | X | | |

A transmitter interface module 610 may also be provided for interfacing with the transmitter. The interface may be between modules located within the wireless communications device itself, or may be interfacing with modules located and operated on a vehicle in which the wireless communications device is in communication. The transmitter interface module 610 may be primarily responsible for controlling whether or not the transmitter is enabled or disabled and may interoperate with all the various modules described previously and herein.

Figure 7:
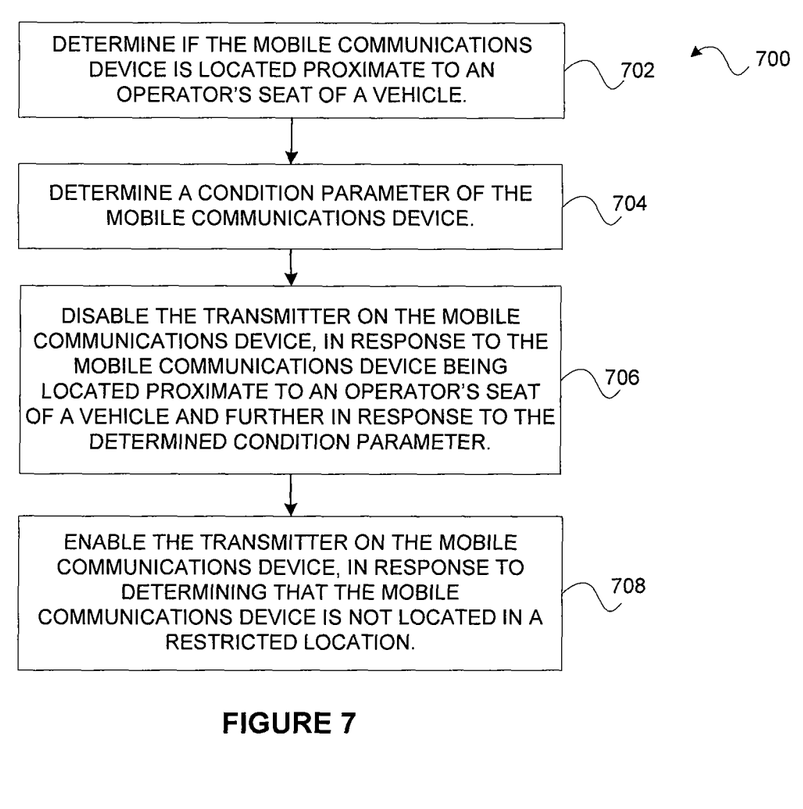
FIG. 7 is a flow chart of one embodiment of an exemplary process for controlling the operability of a transmitter on a mobile communications device.

FIG. 7 is a flow chart of one embodiment of an exemplary process 700 for controlling the operability of a transmitter on a mobile communications device. In step 702, a determination may be made as to whether the mobile communications device is located proximate to an operator's seat of a vehicle. In step 704, a determination of a communications parameter of a mobile communications device may be made. An example of a condition parameter may be whether the wireless communications device or a vehicle is in motion, whether the wireless communications device is gaining or losing altitude, if an emergency has occurred, the particular position within a vehicle of the wireless communications device, or any other condition. A condition parameter is defined as any condition which may affect the desirability of a transmitter to be enabled or disabled at a particular time. In step 706, in response to the mobile communications device being located proximate to an operator seat of a vehicle and further in response to the determined condition parameter, the transmitter on the mobile communications device may be disabled. If it is determined that the mobile communications device is located proximate to an operator seat, and if one of a condition parameter is met, the wireless communications device or its transmitter is disabled.

In step 708, the transmitter on the mobile communications device may be enabled in response to determining that the mobile communications device is not located in a restricted location. For example, regardless of whether the vehicle is in motion, taking off, if an emergency has occurred, or any of the other conditions mentioned previously, if the mobile communications devices is not located within a restricted location, the transmitter may automatically be enabled. It should be understood that some electronic devices may utilize more than one type of wireless technology, and that enablement or disablement of operation and/or operating parameters by this invention may be performed on each technology employed by the particular wireless communications device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for controlling the operability of a mobile communications device, said method comprising:
   determining a geographic location of a vehicle;
   determining a position of the mobile communication devices within the vehicle;
   determining conditional parameters of the mobile communications device, wherein determining the conditional parameters include determining a change in altitude associated with the mobile communications device;
   accessing database records correlating the geographic location with restrictions;
   determining whether use of the mobile communications device should be restricted within the vehicle in response to the geographical location, the position of the mobile communications device within the vehicle, the conditional parameters, and the database records; and
   configuring the capabilities of the mobile communications device that are available in response to the restriction determination.

2. The method according to claim 1, wherein the geographical location of the vehicle is determined in response to a global positioning system of a vehicle.

3. The method according to claim 1, wherein the position indicates whether a user of the mobile communications device is operating the vehicle, and wherein the capabilities of the mobile communications device are restricted in response to determining the user of the mobile communications device is operating the vehicle.

4. The method according to claim 1, wherein the database records are accessed from a remote location through a network.

5. The method according to claim 1, wherein the database records are accessed from within the mobile communications device, and wherein the database records specify restrictions by location.

6. The method according to claim 1, wherein the configuring further comprises:
   selectively restricting the capabilities of the mobile communications device utilizing the restriction determination.

7. The method according to claim 1, wherein the database records include laws, ordinances, and location-based rules restricting the capabilities of the mobile communications device.

8. The method according to claim 1, further comprising:
   enabling the operability of the mobile communications device in response to determining that an emergency has occurred.

9. The method according to claim 1, the conditional parameters include speed.

10. The method according to claim 9, wherein the vehicle is a plane.

11. The method according to claim 1, wherein determining the position of the mobile communications device is determined utilizing one or more sensors.

12. A database management system, the database management system comprising:
   a processor configured to execute a set of instructions;
   a memory configured to store a set of instructions, wherein the set of instructions are executed to:
   determine a geographic location of a vehicle;
   determine a position of the mobile communication devices within the vehicle;
   determine conditional parameters of the mobile communications device, wherein determining the conditional parameters include determining a change in altitude associated with the mobile communications device;

access database records correlating the geographic location with restrictions;

determine whether use of the mobile communications device should be restricted within the vehicle in response to the geographical location, the position of the mobile communications device within the vehicle, the conditional parameters, and the database records; and configure the capabilities of the mobile communications device that are available in response to the restriction determination.

13. The database management system according to claim 12, wherein the set of instructions are further executed to receive information from a global positioning system to make a location determination.

14. The database management system according to claim 12, wherein the position indicates whether a user of the mobile communications device is operating the vehicle, and wherein the capabilities of the mobile communications device are restricted in response to determining the user of the mobile communications device is operating the vehicle.

15. The database management system according to claim 12, wherein the database records specify restrictions by location.

16. The database management system according to claim 12, wherein the database records include laws, ordinances, and location-based rules restricting the capabilities of the mobile communications device.

17. The database management system according to claim 12, the conditional parameters include speed.

18. The database management system according to claim 12, wherein the set of instructions are further executed to:

enabling the operability of the mobile communications device in response to determining that an emergency has occurred.

19. The database management system according to claim 12, wherein the conditional parameters include whether the vehicle is in motion.

20. The database management system according to claim 12, wherein determining the position of the mobile communications device is determined utilizing one or more sensors.

* * * * *